3,130,102
METHOD OF MAKING GOLF BALLS WITH COVERS OF POLYURETHANE

John William Watson and Peter Ford, Erdington, Birmingham, England, assignors to Dunlop Rubber Company Limited, London, England, a British company
No Drawing. Filed May 17, 1961, Ser. No. 110,638
Claims priority, application Great Britain May 19, 1960
14 Claims. (Cl. 156—228)

This invention is concerned with improvements in or relating to balls, particularly golf balls.

Conventional golf balls consist of a core of vulcanised rubber thread wound round a suitable centre and encased in a cover consisting essentially of gutta-percha. Gutta-percha is an expensive material and attempts have been made to manufacture golf balls having covers of material other than gutta-percha. One of the difficulties in using other materials lies in the use of the existing procedure for applying the cover to the core, whatever may be the nature of the latter. This procedure comprises pre-moulding the cover in two half-shells, positioning the core between the two half-shells and finally heating the assembly under pressure in a suitable mould to cause the edges of the half-shells to fuse together and to impress the desired pattern on the surface of the ball. When one attempts to apply this procedure to half-shells formed from a polyurethane one frequently encounters the difficulty of being unable satisfactorily to fuse the half-shells together in the final moulding stage.

We have now found that this difficulty appears to be caused by excessive cross-linking occurring during the pre-moulding of the half-shells. It will be appreciated that when manufacturing golf balls from gutta-percha the latter is in the uncured state during both moulding stages, the crystallinity of the gutta-percha rendering it solid at room temperature and plastic at moulding temperature. When using polyurethanes, on the other hand, it is advisable to cure the polymer in order to obtain favourable physical properties. In consequence the polyurethane changes from a thermoplastic to a non-thermoplastic state and this gives rise to difficulty during moulding, especially as in the manufacture of golf balls from two half-shells two distinct moulding steps are used.

It is an object of the invention to provide an improved process for moulding cored ball half-shells consisting of a polyurethane material. It is a further object of the invention to provide a process for moulding balls from said half-shells.

The invention will be particularly described with reference to golf balls but it is to be understood that it is not limited thereto.

According to the invention, therefore, there is provided a process for the manufacture of a cored ball half-shell, particularly a golf ball half-shell, which comprises moulding and partially curing a curable polyurethane pre-polymer in an unpatterned half-shell mould and then interrupting the curing of the polyurethane pre-polymer in the mould by cooling the half-shell to a temperature at which curing is substantially inhibited.

The resultant cooled half-shell should be sufficiently rigid to be removed from the mould without damage but should still possess sufficient thermoplasticity so that on positioning the cooled half-shell and a similarly manufactured half-shell on either side of a golf ball core in a golf ball mould and continuing curing of the polyurethane pre-polymer, the abutting edges of the half-shell fuse together to form an integral cover around the core.

If the cooling step is omitted in the process according to the invention then either the half-shells are insufficiently rigid to be removed from the half-shell mould whilst still retaining sufficient thermoplasticity for the subsequent moulding step or, alternatively, if the half-shells are sufficiently rigid to be removed from the half-shell mould, the half-shells do not possess sufficient thermoplasticity for the subsequent moulding step. Thus by means of a relatively simple step, viz. cooling, we are able to adapt the use of polyurethanes in the manufacture of golf ball covers to the conventional half-shell method.

The conditions under which the polyurethane pre-polymer is first partially cured and then cooled in the half-shell mould will of course depend on many factors such as nature of pre-polymer, temperature of curing, extent of cooling etc. and the particular conditions required for any given pre-polymer can readily be determined by simple experiment. Where the polyurethane, at the desired stage of thermoplasticity and curing, is still more viscous than solid, cooling is preferably effected by freezing the half-shell to a temperature below its freezing point.

Whilst we prefer to accelerate the partial cure by heating, e.g. at about 80° C., this may also be achieved, but with a longer reaction time, at room temperature.

In the cooling step we prefer to cool at temperatures below 0° C., e.g. −10 to −20° C., but the temperature should not be allowed to fall so low that the half-shell becomes unduly brittle and cannot be handled otherwise the purpose of the cooling step is defeated. Cooling to sub-zero temperatures may be effected by means of solid carbon dioxide.

The term "polyurethane pre-polymer" is used herein for convenience to distinguish the starting material from the cured polyurethane in the golf ball cover. However, it will be understood that the polyurethane pre-polymer is itself a polymer and not merely an intermediate therefor. The polyurethane pre-polymer may be a viscous liquid or an elastomeric material. In general we prefer for convenience in handling to use liquid pre-polymers. The production of polyurethane pre-polymers is well known. Generally, they are prepared by reacting an organic polymer containing hydroxyl groups with an organic polyisocyanate or polyisothiocyanate. Examples of such organic polymers include polyesters, polyethers and polyesteramides, all of which must, however, contain residual isocyanate-reactive groups. Examples of suitable polyesters include polyethylene glycol adipate, polyethylene glycol sebacate, polypropylene glycol adipate and also copolyesters. Examples of suitable polyethers include polyglycols from propylene oxide and tetrahydrofuran. The process according to the invention is particularly suited to polyethers prepared from tetrahydrofuran but is not limited thereto. Polyisocyanates which may be used include naphthalene diisocyanates, tolyiene diisocyanates and diphenyl methane diisocyanates. Polyurethane pre-polymers which may be used include Adiprene L–167, a commercially available pre-polymer prepared from polytetrahydrofuran and tolylene diisocyanate.

Curing is preferably effected by means of a cross-linking agent e.g. a substance containing at least two active hydrogen atoms per molecule, e.g. diols, diamines, etc., but water is preferably not used as a cross-linking agent since, as is known, it reacts with isocyanate end-groups to evolve carbon dioxide; this is undesirable if a good finish is to be obtained on a golf ball cover.

The polyurethane pre-polymer/cross-linking agent mixture may be used alone or may be admixed with other materials, for example, mineral oils, fillers and colouring materials.

The half-shells may be utilised to manufacture a golf ball by positioning one on either side of a previously prepared core in a mould, e.g. as described in the example below in a patterned golf ball mound, which may be of the compression type, where curing of the polyurethane is advanced to a non-thermoplastic state, the abutting edges of the half-shells are fused together and the desired pattern is, if a patterned mould is used, imparted to the cover. The time of cure will depend on the nature of the polyurethane and the temperature of the cure but the conditions appropriate in any given case can readily be determined by simple experiment. The temperature should not of course be so high that the core is damaged. After curing, the ball is preferably stored at room temperature for three days, in order that it may develop its full strength and hardness.

The manufacture of golf ball half-shells and a golf ball according to the invention will now be described. It is to be understood that this description is by way of illustration only.

EXAMPLE

Titanium dioxide (anatase) was dried at 140° C. for 1 hour. After drying, the titanium dioxide was allowed to cool to room temperature in a closed container. The titanium dioxide was then mixed with twice its weight of methylene bis(orthochloraniline) (MOCA), as a crosslinking agent, annd the mixture ball milled for 24 hours to break down aggregates of titanium dioxide. The mixture of MOCA/titanium dioxide was transferred to a vessel which was then evacuated and heated, e.g. on an oil bath, to 140° C. The MOCA melted and dissolved gas was removed. The vacuum was released and the mixture stored in an oven at 110° C. in a sealed container. Immediately prior to use, the mixture was vigorously agitated to re-disperse the titanium dioxide in the liquid MOCA.

30 parts of the prepared MOCA/titanium dioxide mixture at 110° C. were vigorously stirred with 100 parts of Adiprene L–167, a commercially available liquid polyurethane pre-polymer obtained from polytetrahydrofuran and tolylene diisocyanate. Exposure of the compounded polyurethane pre-polymer syrup to the atmosphere was kept to a minimum to avoid reaction with atmospheric moisture.

To minimise pre-curing of the above compounded syrup, it was used as soon as possible, e.g. within 5 minutes of adding the MOCA to the polyurethane pre-polymer. Approximately 5 grams of the compounded syrup were poured into each cavity of a multi-cavity half-shell mould treated with a silicone grease to allow ready release of the moulded half-shell. After standing for approximately three minutes to allow any trapped air bubbles to rise to the surface of the syrup, heat was quickly applied to the surface to burst any bubbles.

The mould was then closed and transferred to a press having the top and bottom platens heated to 105° C. and 100° C., as measured by a thermocouple. A 10 minute cure was given under pressure and the mold was then cooled to room temperature in about 7 minutes, whilst still under pressure, by passing water through the press platens.

The still closed mould was transferred to an insulated box in which it was surrounded with solid carbon dioxide. When the temperature of the half-shell had fallen to about −12° C., the mould was opened. The half-shells were removed from the mould and stored in a metal container surrounded with solid carbon dioxide.

In order to manufacture a golf ball, the frozen half-shell was placed in one half of a patterned golf ball mould and pressed well down with a golf ball core which was left in position. Care was taken to ensure that the edge of the half-shell lay parallel to the edges of the mould. Another half-shell was placed in the other half of the golf ball mould and pressed down in the same way with a second core, the core being thereafter removed. The mould was then closed with the two half-shells and first core in position and transferred to a press having platens heated to 100° C. A 15 minute final cure was given under pressure. The mould was cooled to room temperature in about 7 minutes, whilst still under pressure, by passing water through the press platens and thereafter the mould was opened and the moulded golf ball removed.

The effect on cutting resistance of varying the final curing time is shown in the table below, which also shows a value obtained for a standard gutta-percha covered ball. The cutting resistance of the polyurethane coated balls measured one hour after manufacture was very dependent on the final curing time. The ball with only a 7 minute cure was hardly better than the gutta-percha standard, whereas a 20 minute cure gave a cover having a substantially improved cutting resistance. Storage of the cured balls at room temperature evened out the difficulties so that after five days all the polyurethane covers attained practically the same cutting resistance which was markedly superior to the gutta percha standard.

*Table*

| Final Cure in minutes | Cutting Resistance of Cured Ball after Various Storage times | | | |
|---|---|---|---|---|
| | 1 hour | 1 day | 2 days | 5 days |
| 7 | 18 | 31 | 34 | 34 |
| 10 | 22.5 | 28 | 33 | 35 |
| 15 | 25 | 32 | 35 | 34 |
| 20 | 30 | 35 | 35 | 35 |

Standard—17 (after prolonged storage)

In the cutting resistance test, the golf ball was rigidly clamped in the holder of a pendulum hammer carrying a cutting tool which was allowed to impinge on the ball from increasing heights until visible cutting occurred. The distance of fall to initiate cutting was taken as an arbitrary measure of cutting resistance. The tests were so arranged that such impact occurred on a fresh area of cover.

We claim:

1. A process for the manufacture of a cored ball half-shell which comprises the steps of moulding and partially curing a curable polyurethane pre-polymer in an unpatterned half-shell mould at a temperature from about room temperature to about 105° C and then interrupting the curing of the polyurethane pre-polymer in the mould by cooling the half-shell to a temperature below 0° C.

2. A process as claimed in claim 1, in which said half-shell is a golf ball half-shell.

3. A process as claimed in claim 8 in which the polyurethane is still more a viscous liquid than solid when curing is interrupted by cooling which solidifies it for handling, without damage.

4. A process as claimed in claim 1, in which the part cure of the polyurethane is accelerated by heating.

5. A process as claimed in claim 4, in which the polyurethane is heated at a temperature of about 80° C.

6. A process as claimed in claim 1, in which the cooling is effected at a temperature of −10 to −20° C.

7. A process as claimed in claim 1, in which the polyurethane pre-polymer is a viscous liquid.

8. A process as claimed in claim 1, in which the polyurethane pre-polymer is obtained by reacting a compound selected from the group consisting of polyesters, polyethers and polyesteramides with a compound selected from the group consisting of organic polyisocyanates and organic polyisothiocyanates.

9. A process as claimed in claim 1, in which the polyurethane pre-polymer is obtained by reacting a polyester selected from the group consisting of polyethylene glycol adipate, polyethylene glycol sebacate and polypropylene glycol adipate with a compound selected from the group consisting of organic polyisocyanates and organic polyisothiocyanates.

10. A process as claimed in claim 1, in which the polyurethane pre-polymer is obtained by reacting a polyether derived from a compound selected from the group consisting of propylene glycol and tetrahydrofuran.

11. A process as claimed in claim 1, in which the polyurethane pre-polymer is obtained by reacting a compound selected from the group consisting of polyesters, polyethers and polyesteramides with an organic polyisocyanate selected from the group consisting of naphthalene diisocyanates, tolylene diisocyanates and diphenyl methane diisocyanates.

12. A process as claimed in claim 1, in which curing is effected by means of a cross-linking agent.

13. A process as claimed in claim 12, in which said cross-linking agent is selected from a group consisting of diols and diamines.

14. A process for the manufacture of cored balls which comprises the steps of moulding and partially curing a curable polyurethane pre-polymer in an unpatterned half-shell mould at a temperature from about room temperature to about 105° C., interrupting the curing of the polyurethane pre-polymer in the mould by cooling the half-shell to a temperature below 0° C., positioning a moulded half-shell on either side of a previously prepared core in a mould so that the edges of the half-shells lie parallel to the edges of the mould and advancing the cure of the polyurethane to a non-thermoplastic state so that the abutting edges of the half-shells are fused together.

References Cited in the file of this patent
UNITED STATES PATENTS

| | | |
|---|---|---|
| 2,806,824 | Semegen | Sept. 17, 1957 |
| 2,893,969 | Graham et al. | July 7, 1959 |
| 2,945,693 | Way | July 19, 1960 |
| 2,973,800 | Muccino | Mar. 7, 1961 |
| 3,034,791 | Gallagher | May 15, 1962 |